(12) United States Patent
Reichlin et al.

(10) Patent No.: US 9,156,484 B2
(45) Date of Patent: Oct. 13, 2015

(54) DEVICE FOR OPERATING DECENTRALIZED FUNCTIONAL UNITS ARRANGED IN AN INDUSTRIAL INSTALLATION

(75) Inventors: Anton Reichlin, Winterthur (CH); Daniel Helfer, Bassersdorf (CH)

(73) Assignee: Siemens Schweiz AG, Zuerich (CH)

( * ) Notice: Subject to any disclaimer, the term of this patent is extended or adjusted under 35 U.S.C. 154(b) by 0 days.

(21) Appl. No.: 14/234,307

(22) PCT Filed: Jun. 21, 2012

(86) PCT No.: PCT/EP2012/062007
§ 371 (c)(1),
(2), (4) Date: Feb. 13, 2014

(87) PCT Pub. No.: WO2013/013908
PCT Pub. Date: Jan. 31, 2013

(65) Prior Publication Data
US 2014/0191089 A1    Jul. 10, 2014

(30) Foreign Application Priority Data

Jul. 22, 2011  (EP) .................................... 11174992
Nov. 17, 2011 (EP) .................................... 11189530

(51) Int. Cl.
*B61L 27/04*  (2006.01)
*B61L 19/06*  (2006.01)
*B61L 27/00*  (2006.01)

(52) U.S. Cl.
CPC ................. *B61L 27/04* (2013.01); *B61L 19/06* (2013.01); *B61L 27/0005* (2013.01)

(58) Field of Classification Search
CPC ..... B61L 2205/00; B61L 19/06; B61L 27/04; B61L 27/0005; B61L 27/00; B61L 27/0038; G06Q 40/04; H02J 3/008; H02J 13/0006
See application file for complete search history.

(56) References Cited

U.S. PATENT DOCUMENTS 6,563,234 B2    5/2003  Hasegawa et al.
2010/0306097 A1 * 12/2010  Greiner et al. .................. 705/37

(Continued)

FOREIGN PATENT DOCUMENTS

DE    10200802448 A1 * 12/2009
DE    102008044902 A1    3/2010

(Continued)

*Primary Examiner* — Rodney Butler
(74) *Attorney, Agent, or Firm* — Laurence A. Greenberg; Werner H. Stemer; Ralph E. Locher

(57) ABSTRACT

A device and a method operate decentralized functional units arranged in an industrial installation. The device contains a superordinate control system which interchanges information with the decentralized functional units using data messages, and a data transport network having a number of network access points. The superordinate control system is coupled to the data transport network via at least one network access point. The device further has communication units which are connected to a network access point and provide the decentralized functional units with access to the data transport network, and an energy transport network to which the decentralized functional units are connected and which supplies the decentralized functional units with electrical energy. A number of intelligent energy stores are connected to the energy transport network and consume energy and/or output energy in accordance with the super ordinate control system and/or at least one of the other energy stores.

11 Claims, 5 Drawing Sheets

(56) References Cited

U.S. PATENT DOCUMENTS

| | | |
|---|---|---|
| 2011/0015882 A1* | 1/2011 | Guilhemsang et al. ......... 702/59 |
| 2011/0109266 A1 | 5/2011 | Rossi |
| 2011/0148345 A1 | 6/2011 | Böckermann et al. |

FOREIGN PATENT DOCUMENTS

| | | |
|---|---|---|
| EP | 1122856 A2 | 8/2001 |
| EP | 1995916 A1 | 11/2008 |
| JP | 2006281960 A * | 10/2006 |

* cited by examiner

DEVICE FOR OPERATING DECENTRALIZED FUNCTIONAL UNITS ARRANGED IN AN INDUSTRIAL INSTALLATION

BACKGROUND OF THE INVENTION

Field of the Invention

The present invention relates to a device and a method for operating decentralized functional units arranged in an industrial installation.

Such decentralized functional units are used in particular in rail traffic networks, such as in the railroad for example, where said units are used to control vehicle-influencing and/or vehicle monitoring units and monitor them with regard to their functionality and to accept and acknowledge process data. Signals, switches, balises, line cables, track magnets and such like, as well as sensors for capturing process variables of the moving train, such as power consumption, speed and the like, can be considered as train-influencing units, which thus give instructions to the vehicle driver or even intervene directly in the vehicle control or directly set a safe route. Likewise balises and line cables, but also axle counters and track circuits can be said to be train and track section monitors. Basically however the present invention relates to all industrial installations in which functional units are distributed over longer distances and yet still have to be controlled centrally. The central control in such cases can be handled by a control center at a fixed location, but also by a virtual control center not at a fixed location.

In rail traffic it is usually the case that these decentralized functional units are controlled by an interlocking or a remote setting computer. Standardized copper cables are generally provided nowadays for data transfer between the interlocking and the functional units in the track area, for the standard setting distance lengths of which, because of the physical transmission parameters, the cable coatings (RLC) are restricted in practice to an upper limit of 10 km. With certain types of functional units however these upper limits can lie at a maximum of just 6.5 km.

Nowadays however data networks are already being employed in railroads which are used for example for interchange of data between adjacent interlockings or between the interlockings and control systems. They are however not used in such a way as to control and to monitor train-influencing and/or train monitoring functional units, in order by doing so to make it possible to bridge almost any given setting distances. These networks are instead designed as a type of data transport network (DTN), e.g. an optical transport network, and are employed for the transfer of data for the operational level and the like.

These types of data network allow a very much greater number of degrees of freedom in respect of the definition of the position of the coupling points for the connection of interlocking and control system installations or parts thereof and thus of their installation sites,
the transmission method applied and the communication distances between different installation parts.

These data networks thus occasionally make possible a significant improvement in the price-performance ratio and yet still allow a highly reliable and correspondingly safe interchange of data of the railroad safety devices along rail installations.

Clear examples of applications for such data networks are branch sections or sections with ETCS Level 2 or long tunnel sections, for which currently, because of the limits for the setting distance lengths with conventional interlocking cables, an arrangement of interlocking processors within tunnels is made necessary. The harsh deployment conditions obtaining therein demand that the interlocking processors are encapsulated in compartments or containers and/or operated with air conditioning. Maintenance in these cases is correspondingly expensive. The overall problem thus consists of interlocking and external installation parts not being able to be at just any distance from one another because of the limited setting distances.

The innovative data networks have a disadvantage however to the extent that basically each central and decentralized functional unit must be coupled in to such a data network in a suitable manner via an access point and in a redundant manner for reasons of availability. Thus at the moment a comparatively high outlay for coupling with the data network is necessary at an individual network node for connection of a functional units, with at the same time only a comparatively small data transfer rate in relation to the network capacity. While current glass fiber networks for example allow for transmission rates extending from Gigabit through to Terabit transfer power, these transmission rates are however only used very marginally in these safety applications.

At the same time, above and beyond this, an economic interest on the part of the railroad infrastructure operators can be discerned for continuing to use the existing so-called long-life interlocking cables (copper cables adapted to the rail tracks) which are currently employed for the operation of the functional units by the interlockings, for the control of the external installations.

To achieve this object a device and a method are known from European patent application EP 2 301 202 A1 for controlling and/or monitoring decentralized functional units arranged along a traffic network, which includes the following core items:

a) A super ordinate control system which interchanges information with the decentralized functional units by means of data telegrams,
b) A data transport network with a number of network access points, wherein the super ordinate control system is coupled via at least one network access point to the data transport network;
c) Communication units, which are connected in each case to a network access point, wherein:
d) The decentralized functional units are grouped together into subgroups, each with its own subnetwork and wherein
e) The subnetwork of each of the subgroups is coupled at each of its two ends to the data transport network via a communication unit and via a network access point.

In this way one digital transport network can be used for coupling-in of the decentralized functional units, which is robust in relation to a single error event in all respects yet still allows a very clever use of copper cables widely used in railroad technology, for example previously available interlocking cables, and ultimately also only needs a comparatively small number of network access points.

Such a device is able to be employed in this case in an especially advantageous manner for a rail network for railroad traffic. Consequently it is then expedient, in a further advantageous embodiment, to couple traffic-monitoring and traffic-control functional units, such as especially signals, switches, axle counters, track circuits, point and linear-type train influencing elements, into the data transport network by means of the decentralized functional units.

The structure of technical installations, also especially in the rail infrastructure, is designed on the basis of the more than 100 years of history of industrial systems engineering and railroads, for robustness and reliability. As the system was conceived in those days, the external elements of the railroad safety installations in particular were connected by relatively heavy cable wires, to enable the switching states over the defined distances to be safely detected, i.e. the system was designed in accordance with the peak loads with sufficient reserve. With the switching process of the external elements information is transferred via the energy feeds as well. However it obviously also follows that the distances possible are restricted by the detectable energy flow. As regards current aspects of flexibility, costs and resource policy, these established concepts, as well as the communication structure disclosed by EP 2 301 202 A1, urgently require innovation in the area of energy supply as well. As part of the modernization initiated with such systems, the Mobility division of Siemens will be undertaking fundamental innovations as regards its interlocking architectures in the coming years, wherein the solution for decentralizing the control and signaling systems will be fully taken into account. This means that in the final configuration all elements to be controlled and monitored (signals, switches, train safety systems, track availability systems such as axle counting points, railroad crossings) will be given a control or signaling point locally on the track—referred to below as an element controller EC or decentralized functional unit DFE.

BRIEF SUMMARY OF THE INVENTION

Since the strategic basis for the future will be based on the two architecture changes listed below in the electronic interlockings from Siemens, that the previous coupling of information and energy will be decoupled, as well as the introduction of a real-time-capable and high-availability wide area communications system between the interlocking processor (central control unit) and the setting and monitoring devices (Element Controllers EC) required along the track, the supply of energy from the interlocking to the element controllers on the track is to be completely redesigned, which is the object of the present invention.

As regards the device, this object is achieved in accordance with the invention by a device for operating decentralized functional units arranged in an industrial installation, comprising:
a) A super ordinate control system which interchanges information with the decentralized functional units by means of data telegrams,
b) A data transport network with a number of network access points, wherein the super
ordinates control system is coupled via at least one network access point to the data transport network;
c) Communication units, which are connected in each case to a network access point and provide the decentralized functional units with access to the data transport network,
d) An energy transport network to which the decentralized functional units are connected and which supplies the decentralized functional units with electrical energy; and
e) A number of intelligent energy stores connected to the energy transport network, which carry out energy acceptance and/or output in collaboration with the super ordinate control system and/or with at least one of the other energy stores.

As regards the method, this object is achieved in accordance with the invention by a method for operating decentralized functional units arranged in an industrial installation, said method having the following steps:
a) A super ordinate control system which interchanges information with the decentralized functional units by means of data telegrams,
b) A data transport network with a number of network access points, whereby the super ordinate control system is coupled via at least one network access point to the data transport network;
c) Communication units which are connected to a network access point and provide the decentralized functional units with access to the data transport network,
d) An energy transport network to which the decentralized functional units are connected and which supplies the decentralized functional units with electrical energy; and
e) A number of intelligent energy stores connected to the energy transport network, which carry out energy acceptance and/or output in collaboration with the super ordinate control system and/or with at least one of the other energy stores.

In this way the energy transport network is now completely decoupled from an interlocking and, thanks to the energy stores provided, can now be designed in respect of cabling and transmission capacity for a certain predetermined basic load, wherein load peaks of electrical power consumption, for example when changing the position of a switch, closing and opening a rail crossing, is smoothed by the intelligent energy stores. The energy stores are referred to as intelligent because, for power consumption and/or power output, they coordinate with the super ordinate control system and/or at least one of the other energy stores to the extent that charging and/or discharging can take place in a controlled, checked manner.

Based on the current interlocking architecture with decentralized stations, but point-to-point energy supply, a new, innovative approach is adopted by the present invention. The current cabling- and labor-intensive point-to-point connections for the power supply or the energy supply of the trackside peripheral elements (called an element controller or also a decentralized functional unit) are replaced by wire-saving and simple-to-install bus or ring lines. The use of intelligent decentralized energy stores makes simple energy supply of the element controllers along the track even over large distances possible with cables having a small wire cross-section. Brief peak loads, such as the changing of a switch or the opening of the barrier of a railroad crossing, are satisfied locally by the energy stores also able to be implemented as short-term energy stores. The installations thus no longer have to be dimensioned for the "worst case" energy consumption, but it is sufficient to design them for average energy consumption. This is actively supported by a super ordinate intelligent energy management over the entire installation for demand-driven distribution of the energy at the individual consumers. Intelligent energy management takes account on the one hand of the availability demanded for a specific installation depending on the route category and also the actual traffic volume in rail operation. State-of-the-art storage technologies, e.g. SuperCaps (e.g. decentralized short-term energy stores) or flywheel energy stores with composite materials as system components can be used as the energy stores. This means that the present invention also successfully replaces the current battery-supported USP systems (lead accumulators) wherever possible by more favorable and ecologically better storage components. A further innovation in such cases is also represented by the inherent intelligence of the individual energy stores in the overall system. Depending on the arrangement of the store in the network topology, not only is energy to be supplied on a demand-driven basis for a directly assigned consumer, but it should also be possible to feed energy back into the overall system. The redundancy of the energy provision is increased thereby and the availability of the interlocking system can be safeguarded in this way or even enhanced compared to current architecture.

In addition the use of intelligent energy stores also results in very far-reaching opportunities for flexible design of the interworking infrastructure or generally of energy networks. Smart grids could be possible relatively simply for example on the basis of the intelligent stores described here, without major parts of an existing energy distribution network having to be switched over entirely. With this approach not only is the previous point-to-point line routing for the supply of energy along the track put onto a new foundation, but likewise the spatially limited extent of interlocking installations resulting from this (0 to 6.5 km) is removed. In the future this will make possible the implementation of electronic interlocking architectures which take account both of the requirements for functionality, reliability and maximum availability, and also satisfy aspects of the preservation of resources, sustainability, energy efficiency and ecological and economic design of the railroad infrastructures. The present invention however is far from limited to the interlocking architecture of railroad installations application described, but goes far beyond this. Future examples envisaged are energy management based on decentralized energy stores for buildings or for large installations in the production or processing industry.

In an advantageous embodiment of the present invention, functional units monitoring and controlling traffic, such as especially signals, switches, axle counters, track circuits, point or linear train-influencing elements, are coupled to the data transport network by means of the decentralized functional units. The decentralized functional unit thus also provides the energy necessary for the operation of a signal, switch, axle counter, track circuit, point or linear train-influencing element.

To enable the distributed approach for energy storage in the energy network it is particularly expedient for the intelligent energy stores to include control and communication means, which allow the intelligent energy stores to coordinate charging and/or discharging processes by means of a corresponding data communication with one another. In such cases the data communication can be carried out via the energy transport network (termed Powerline Communication); as an alternative or in addition to this the intelligent energy stores can couple to the data transport network like a decentralized functional unit by means of a respective available communication unit and data communication between the intelligent energy stores takes place via the data transport network. Thus an intelligence can be made possible for the energy stores to the extent that the power is consumed and output in a controlled manner within the energy transport network.

In a further advantageous embodiment of the present invention power consumption is controlled by the energy store so that this power consumption is only undertaken if no power consumption exceeding the basic load in the energy transport network by a decentralized unit occurs. Thus the consumption is controlled for example so that during the energy-intensive changeover of a switch or the closing and opening of a railroad crossing, no power for charging an energy store can actually be taken out of the energy transport network.

Further advantageous embodiments of the present invention can be taken from the other sub claims.

Advantageous exemplary embodiments of the present invention are explained in greater detail with reference to the drawing. In the figures:

DESCRIPTION OF THE INVENTION

Figure 1:
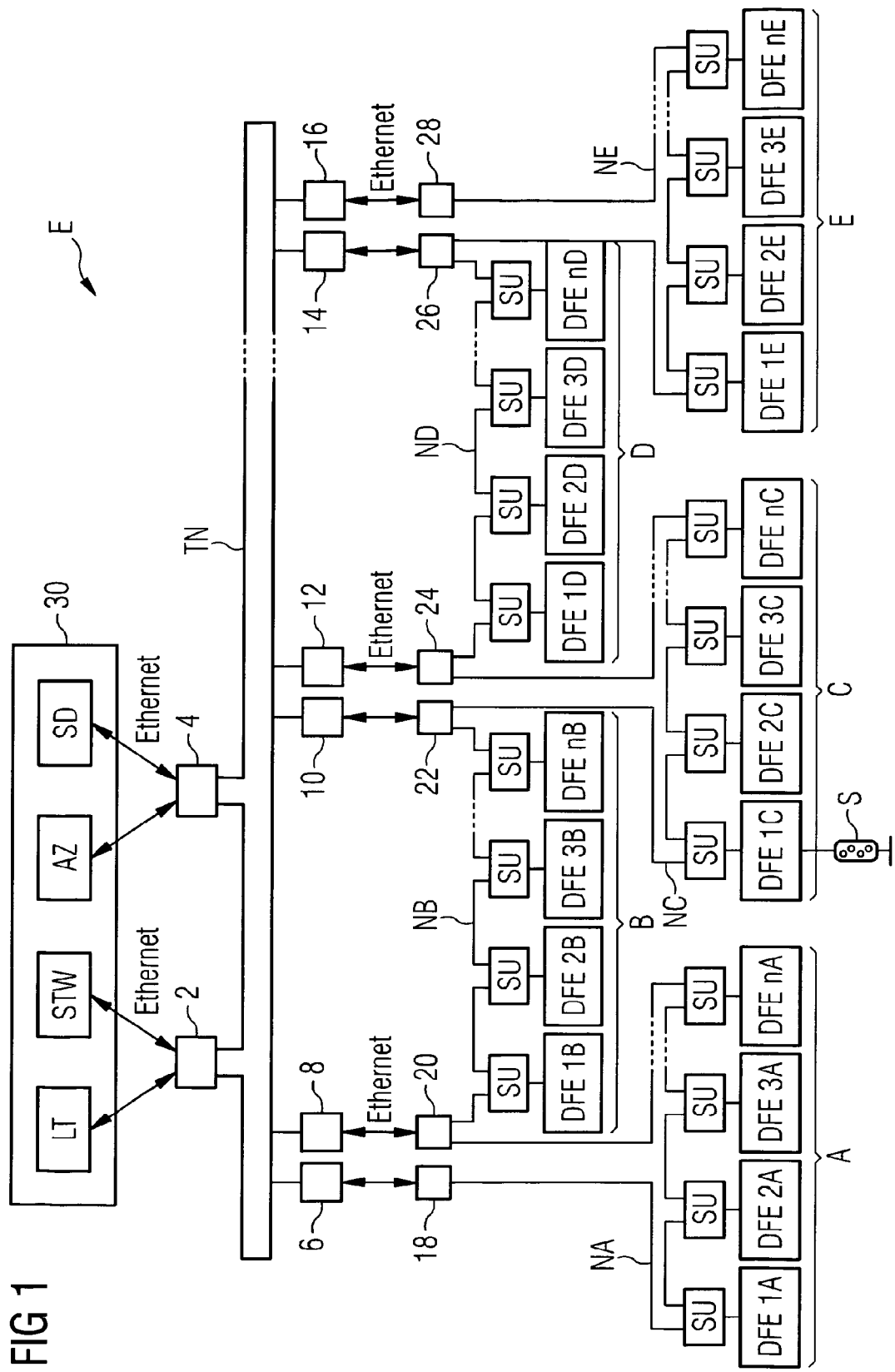
FIG. 1 shows a schematic view of the layout of a device E for control and/or monitoring of decentralized functional units arranged along a railroad network in accordance with EP 2 302 202 A1.

FIG. 1 shows a schematic view of the layout of a device E for control and/or monitoring decentralized functional units DFE1A to DFEnA, DFE1B to DFEnB etc. (also called element controllers EC below) arranged along a railroad network (not shown in greater detail here). Should a specific functional unit not be meant, the decentralized functional units are referred to below by the letters DFE. These types of decentralized functional units DFE are used to control and to monitor train-influencing and/or train-monitoring units. Signals, switches, balises, line cables, track magnets and the like can be referred to as train-influencing units for example. Balises and line cables can likewise be referred to as train-monitoring units, as can axle counters and track circuits. For example a signal S is controlled and monitored by the decentralized functional unit DFE1C. The decentralized functional unit DFE1C in such cases controls the display of the signal terms and guides or assists in monitoring functions respectively, such as the monitoring of the lamp current in the signal for example.

Each decentralized functional unit DFE or the unit controlled/monitored by it has an address unique in the overall network, for example an IP address or a MAC address.

The device E further comprises a data transport network TN with a number of network access points 2 to 16. Communication units 18 to 28 are connected to a part of these network access points 6 to 16. The data transport network TN is embodied as a high-availability network here. Such high-availability structures can be produced on the one hand by a redundant design of the network itself and/or on the other hand by a clever re-organization of the network on failure of a connecting piece.

The device E also comprises a superordinate control system 30 which, along with components not described in any greater detail here, include a control center LT, an interlocking processor STW, an axle count processor AZ and a service/diagnosis unit SD, which are connected to the data transport network TN via the network access points 2 and 4 by means of Ethernet connections.

As shown in FIG. 1, the decentralized functional units DFE are coupled by one of the communication groups 18 to 28 and the corresponding network nodes 6 to 16 to the transport network TN and can thus receive or interchange data telegrams via said network. The decentralized functional units DFE are grouped into subgroups A, B, C, D and E each with its own subnet work NA, NB, NC, ND and NE in such cases. The subgroup A is formed for example from the decentralized functional units DFE1A, DFE2A, DFE3A to DFEnA. In such cases the subgroups A to E are always connected at their two ends with a one of the communication groups 18 to 28 in each case and a network access point 6 to 16. Each decentralized functional unit DFE also has an upstream switching unit SU, which, as an alternative, can also be integrated directly into the decentralized functional unit DFE, which establishes the connection to the subnet work for the decentralized functional units DFE, so that each decentralized functional unit DFE can still be addressed on failure of a communication group by a second redundant communication group 18 to 28.

Each subnet work (NA to NE) is thus constructed from a number of point-to-point connections of logically-adjacent decentralized functional units (DFE). In such cases a point-to-point connection is embodied as an autonomous transmission link within the subnet work, for example as an ISDN transmission link or as an xDSL transmission link or optical fiber transmission link. Thus an individual subnet work, which for its part only ever has to deal with the transmission from point to point, can be constructed so to speak from individual transmission cells. In other words a much longer and more complex subnet work can thus be constructed from simple, rather short-range technologies. For this reason it is expedient to terminate the point-to-point connection at each end with a switching unit (SU), through which the opportunity is produced to change the point-to-point transmission technology from cell to cell and thus enable the most suitable transmission technology to be chosen in each case. A suitable switching unit (SU) can be designed for this purpose so that it provides a number of point-to-point transmission technologies and, depending on the circuitry, provides the point-to-point transmission technology determined by the circuitry in a self-organizing manner.

Furthermore the subgroups A to E are each connected to the two communication groups 18 to 28 at a first connection type or a second connection type. In the first connection type, such as is shown for the subgroups A, C and E for example, the associated subnet work NA, NC and NE is terminated into geographically closely located communication groups 18 and 20 or 22 and 24 or 26 and 28, which is to be shown in FIG. 1 by the immediate adjacency of the communication group pairs 18, 20 and 22, 24 and 26, 28. In the second connection type, as is shown for the subgroups B and D, the respective subnetwork NB or ND will be terminated with the spatially more widely spaced communication groups 20, 22 or 24, 26. Here too, on failure of one of the two associated communication groups, each subgroup B and D is then still connected to a further communication group.

If it is now assumed that the network access points 6, 8 and 10, 12 and 14, 16 are each arranged at stations of the railroad network, then the subgroups A, C and E tend to represent the decentralized functional units DFE arranged in the station area. The subgroups B and D tend to represent such decentralized functional units DFE, as are arranged in the area between two stations on open tracks. In such cases the widely-available existing copper cables present in large numbers can possibly be used for the coupling-in of these decentralized functional units DFE, which will be explained using the subgroup B is an example. Previously for example the decentralized functional units DFE1B, DFE2B and DFE3B have been controlled from the station at network access point 8. Accordingly the remaining decentralized network access points DFEnB are controlled from the station at network access point 10. Thus it was sufficient just to establish one connection between the decentralized functional units DFE3B and DFEnB in order to connect the subgroup B in the subnet work NB together.

The system boundaries of the device E can in this case be described as follows:

- The number of network access points 2 to 16 on the transport network OTN is only limited by the system performance (interlocking processor STW, transport network OTN);
- The number of DFEs on a subnet work A to E amounts to a minimum of one DFE: the maximum number of connectable DFEs is limited by the system performance (a minimum of 8 DFEs might be desired for example);
- The number of communication units 18 to 28 at a network access point 6 to 16 is essentially limited by the maximum number of Ethernet interfaces of the selected network access points 6 to 16.
- The maximum number of subnet works A to E connectable to a communication unit 18 to 28 can amount to 4 subnet works in the exemplary embodiment selected.

As regards availability it can be stated that:

One subnet work A to E must be connected to two communication units 18 to 28;

The communication units 18 to 28 belonging to a subnetwork A to E must be connected to two network access points; in such cases the two network access points 2 to 16 can be connected to the same transport network OTN or to two network access points of two different transport networks (this case for the second transport network OTN has not been shown here but is readily able to be implemented technically).

In order to satisfy performance requirements and be able to work with simple transmission means such as e.g. ISDN, the telegrams can be subdivided into real-time and non-real-time telegrams within the subnet works A to E:

Real-time telegrams: payload data telegrams from the interlocking to the DFEs, no TCP/IP telegrams, specific Ethernet frame type;

Non-real-time telegrams: normal TCP/IP telegrams, no payload data telegrams.

The telegram types have fixed timeslots assigned. The assignment can be fixed during operation and able to be parameterized off-line, for example in a ratio of at least 1 to 10.

Figure 2:
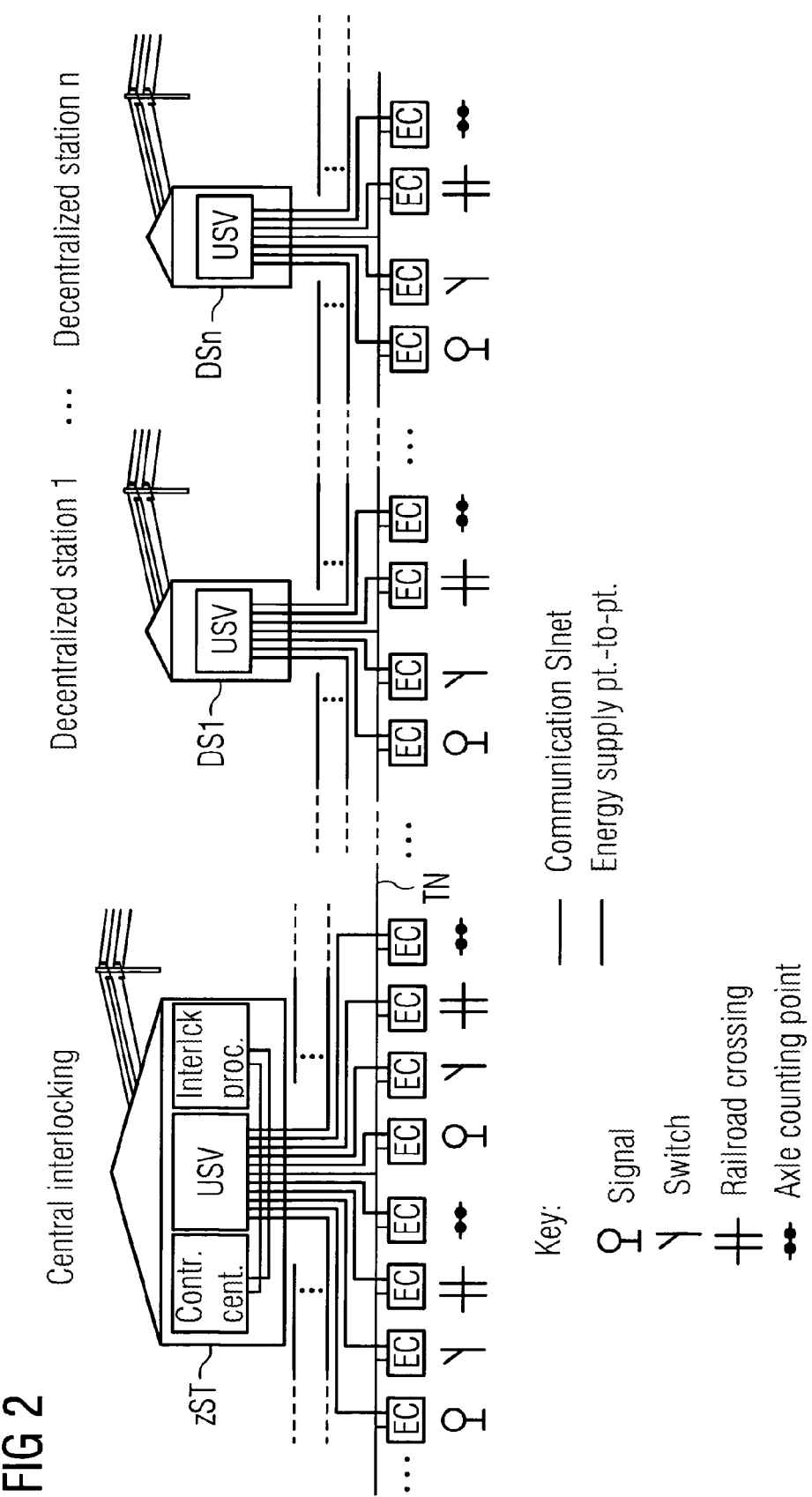
FIG. 2 shows a schematic view of a simplified diagram of the device as per FIG. 1.

FIG. 2 now shows the situation in accordance with FIG. 1 in a simplified diagram. The Element Controllers EC are connected for data transmission to the data transport network TN and are supplied directly with electrical energy from a central interlocking zST or from decentralized stations DS1 to DSn via a universal power supply USV in each case. This embodiment thus still depends on the condition that specific setting distances cannot be implemented (any longer) with this supply solution. For example the distance of around 6.5 km to the signal lamps is still reliable, via which flowing lamp current can be monitored.

Figure 3:
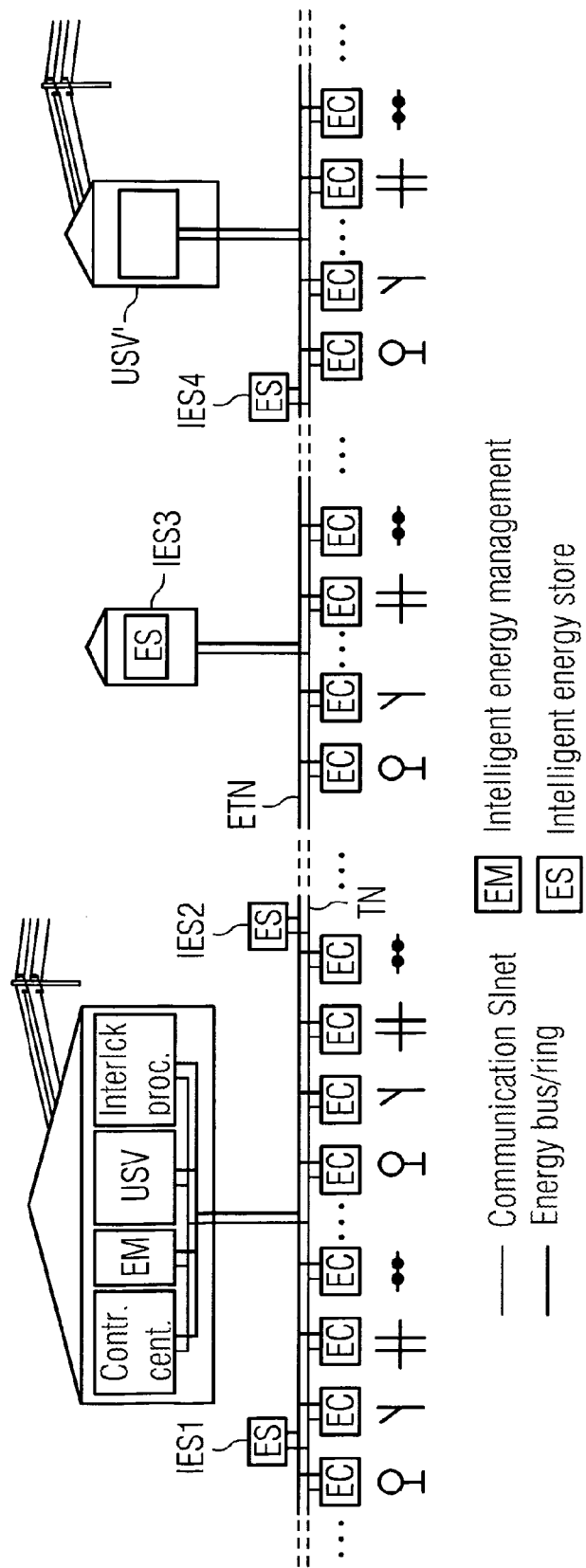
FIG. 3 shows a schematic view of the diagram of the device as per FIG. 2, with the superimposed energy supply concept as per the present invention.
Figure 6:
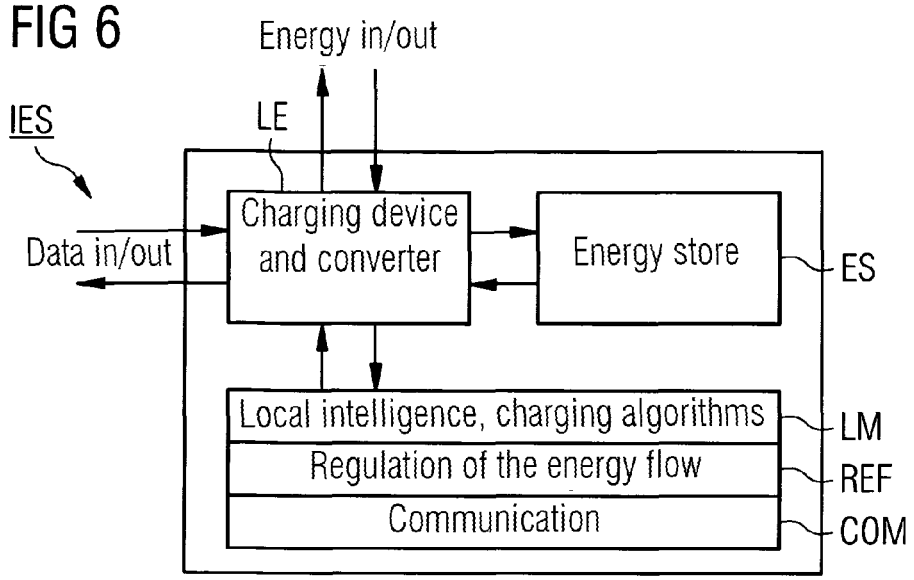
FIG. 6 shows a schematic view of an intelligent energy store.

FIG. 3 now shows a schematic diagram of the situation only still applicable as regards data transmission with the inventive energy supply concept. All Element Controllers are now on the same energy transport network ETN. Electrical energy is now no longer supplied exclusively from the central interlocking, but is also supplied via external power supplies USV', which however otherwise no longer have any reference to the data handling of the Element Controllers EC. Intelligent energy stores IES1 to IES4 are now connected to the electricity transport network ETN and the data transport network TN as suitable positions of the electricity transport network ETN, so that these intelligent energy stores IES1 to IES4 can communicate for data processing via the data transport network TN with the central interlocking zST and thus power can be accepted and/or output in a controlled manner via an energy manager IEM implemented in the logic of the central interlocking zST. The intelligent energy stores IES1 to IES4 in such cases, in addition to a charging device with converter LE and the actual energy store ES, also have a local logic module LM, a regulation of an energy flow REF and a communication module COM (cf. FIG. 6).

Figure 4:
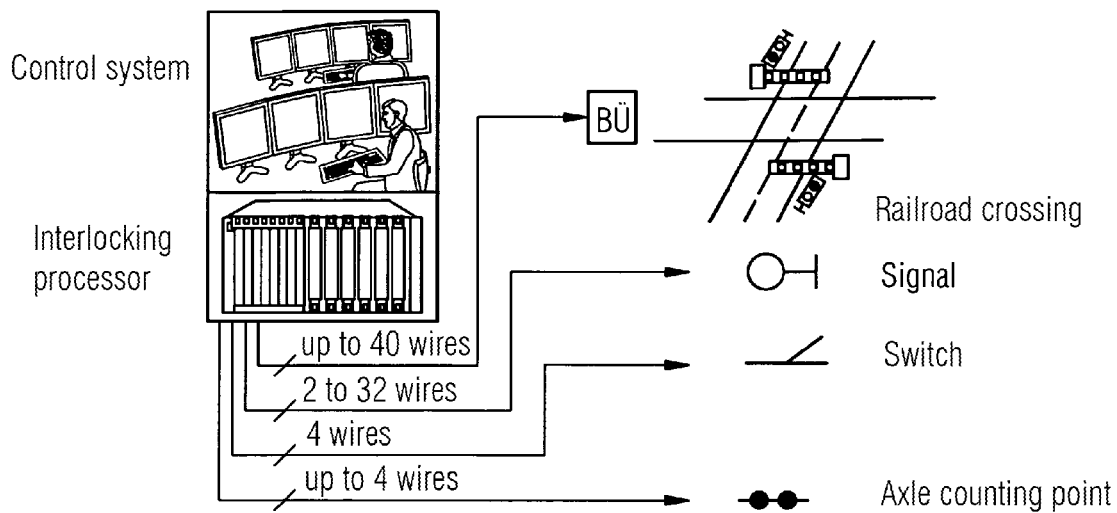
FIG. 4 shows a schematic view of the connection of field elements to an interlocking as per the prior art.
Figure 5:
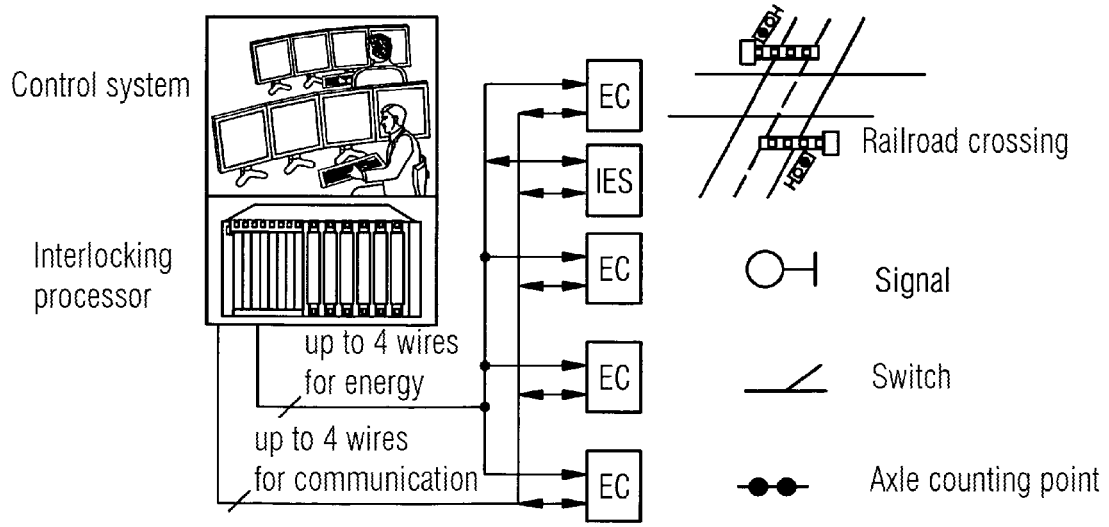
FIG. 5 shows a schematic view of the connection of field elements to an interlocking and an energy bus as per the present invention.

FIG. 4 shows a schematic of the connection of field elements, such as railroad crossing, signal, switch and axle counting points, in accordance with the prior art. For a railroad crossing up to 40 cable wires for power supply and data communication emerge from the interlocking processor STW. Accordingly a signal, depending on its structure and task, has more than 2 to 32 cable wires, a switch has 4 cable wires and an axle counting point more than 4 cable wires. In accordance with the new concept shown in FIG. 5 only 4 cable wires for the electrical energy and up to 4 cable wires for communication then emerge from the interlocking computer STW for the same field elements. In this case the interlocking computer, as already shown in FIG. 1, is connected via a network access point 2 to the data transport network TN.

Figure 7:
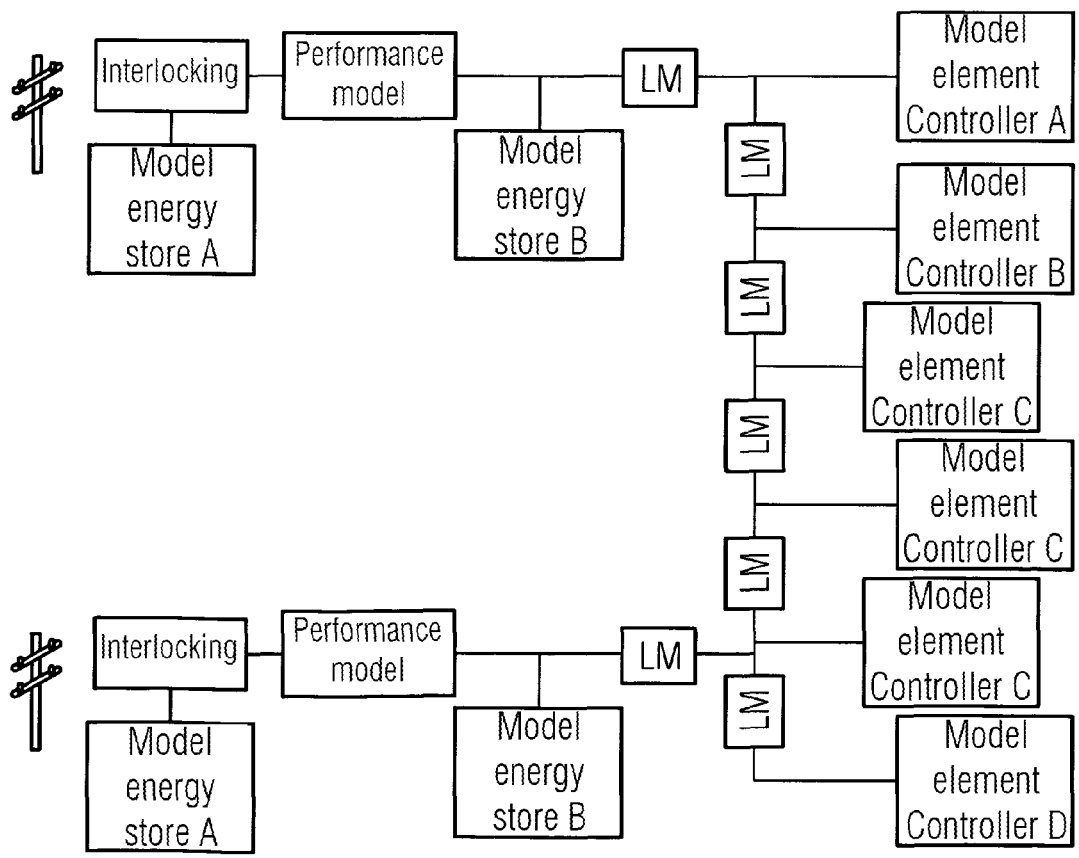
FIG. 7 shows a schematic view of the results of a simulation computation for a situation in the track area able to be scaled in respect of the field elements and the energy stores.

FIG. 7 now shows an example of the results of a simulation computation for a scalable situation in the track area in respect of the field elements and the energy stores. In this case scalable line models and scalable energy stores are also used. Mechanical flywheel energy stores and super capacitors can be used as energy stores in such cases. FIG. 7 therefore also shows the benefits of the present concept of energy stores arranged distributed decent rally in the energy transport network, so that the design of the energy transport network can use the contribution of the energy stores to the extent that the cable wires of the network only have to be designed for a predetermined basic performance.

The invention claimed is:

1. A device for operating decentralized functional units disposed in an industrial installation, the device comprising:
   a super ordinate control system for interchanging information with the decentralized functional units by way of data messages;
   a data transport network with a number of network access points, said super ordinate control system coupled via at least one of said network access points to said data transport network;
   communication units connected in each case to one of said network access points and providing the decentralized functional units with access to said data transport network;
   an energy transport network to which the decentralized functional units are connected and supplying the decentralized functional units with electrical energy;
   a number of intelligent energy stores connected to said energy transport network, said intelligent energy stores receiving energy and/or output the energy in coordination with said super ordinate control system and/or with at least one of the other said intelligent energy stores; and
   units for monitoring and controlling traffic, and selected from the group consisting of signaling devices, switches, axle counters, track circuits, point and line type train-influencing elements, said units coupled to said data transport network by way of the decentralized functional units.

2. The device according to claim 1, wherein the industrial installation is a railroad network for railroad traffic.

3. The device according to claim 1, wherein said intelligent energy stores include control and communication devices which allow said intelligent energy stores to coordinate charging and/or discharging processes with one another by way of appropriate data communication.

4. The device according to claim 3, wherein the data communication is carried out via said energy transport network.

5. A device for operating decentralized functional units disposed in an industrial installation, the device comprising:
   a super ordinate control system for interchanging information with the decentralized functional units by way of data messages;
   a data transport network with a number of network access points, said super ordinate control system coupled via at least one of said network access points to said data transport network;
   communication units connected in each case to one of said network access points and providing the decentralized functional units with access to said data transport network;
   an energy transport network to which the decentralized functional units are connected and supplying the decentralized functional units with electrical energy;
   a number of intelligent energy stores connected to said energy transport network, said intelligent energy stores receiving energy and/or output the energy in coordination with said super ordinate control system and/or with at least one of the other said intelligent energy stores, said intelligent energy stores having control and communication devices allowing said intelligent energy stores to coordinate charging and/or discharging processes with one another by way of appropriate data communication, said intelligent energy stores being coupled to said data transport network like a decentralized functional unit each by way of one of said communication units and data communication of said intelligent energy stores takes place via said data transport network.

6. A method for operating decentralized functional units disposed in an industrial installation, which comprises the steps of:
   interchanging information between a super ordinate control system and the decentralized functional units by way of data messages;
   coupling the super ordinate control system to a data transport network via at least one network access point of the data transport network having a plurality of network access points;
   providing communication units, being connected in each case to one of the network access points, and provide the decentralized functional units with access to the data transport network;
   providing an energy transport network to which the decentralized functional units are connected and supplying the decentralized functional units with electrical energy;
   providing a number of intelligent energy stores connected to the energy transport network, the intelligent energy stores receive energy and/or output the energy in coordination with the super ordinate control system and/or with at least one of the other intelligent energy stores; and
   monitoring and controlling traffic via units selected from the group consisting of signaling devices, switches, axle counters, track circuits, point and line-type train influencing elements, the units being coupled to the data transport network by way of the decentralized functional units.

7. The method according to claim 6, wherein the industrial installation is embodied as a rail network for railroad traffic.

8. The method according to claim 6, wherein the intelligent energy stores include control and communication devices which allow the intelligent energy stores to coordinate charging and/or discharging processes with one another by way of appropriate data communication.

9. The method according to claim 8, which further comprises carrying out the data communication via the energy transport network.

10. The method according to claim 8, which further comprises coupling the intelligent energy stores to the data transport network like a decentralized functional unit by way of the communication units available in each case and data communication of the intelligent energy stores takes place via the data transport network.

11. A method for operating decentralized functional units disposed in an industrial installation, which comprises the steps of:
  interchanging information between a super ordinate control system and the decentralized functional units by way of data messages;
  coupling the super ordinate control system to a data transport network via at least one network access point of the data transport network having a plurality of network access points;
  providing communication units, being connected in each case to one of the network access points, and provide the decentralized functional units with access to the data transport network;
  providing an energy transport network to which the decentralized functional units are connected and supplying the decentralized functional units with electrical energy;
  providing a number of intelligent energy stores connected to the energy transport network, the intelligent energy stores receive energy and/or output the energy in coordination with the super ordinate control system and/or with at least one of the other intelligent energy stores; and
  controlling power consumption by an energy store so that the power consumption is only carried out if no power consumption by a decentralized functional unit exceeding a basic load in the energy transport network is occurring.

* * * * *